United States Patent [19]
Schulz et al.

[11] Patent Number: 6,164,739
[45] Date of Patent: *Dec. 26, 2000

[54] MULTILAYER PROTECTIVE FILM

[75] Inventors: Thomas G. Schulz; Mark C. Danner, both of Newark; Glenda J. Cahill, Granville; Harvey C. Tung, Newark, all of Ohio

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/936,209

[22] Filed: Sep. 24, 1997

Related U.S. Application Data

[62] Division of application No. 08/629,456, Apr. 10, 1996, which is a continuation of application No. 08/138,939, Oct. 18, 1993.

[51] Int. Cl.⁷ .............................. B32B 7/04; A47B 96/04
[52] U.S. Cl. ................... 312/406; 52/309.9; 428/317.7; 428/319.3
[58] Field of Search ..................................... 312/406, 401; 428/308.4, 317.1, 317.7, 319.3, 319.7, 319.9; 52/309.8, 309.9

[56] References Cited

U.S. PATENT DOCUMENTS

| | | |
|---|---|---|
| 4,196,950 | 4/1980 | Churchill et al. . |
| 4,284,674 | 8/1981 | Shepzak ................................. 52/309.9 |
| 4,629,596 | 12/1986 | Coffman . |
| 4,647,509 | 3/1987 | Wallace et al. . |
| 5,009,952 | 4/1991 | Klepach et al. . |
| 5,118,174 | 6/1992 | Benford et al. . |
| 5,128,196 | 7/1992 | Luetkens, Jr. et al. ............... 428/319.3 |
| 5,227,245 | 7/1993 | Brands et al. . |
| 5,338,601 | 8/1994 | Brands et al. . |
| 5,354,402 | 10/1994 | Luetkens, Jr. et al. ............... 428/319.7 |
| 5,418,055 | 5/1995 | Chen et al. .............................. 312/406 |
| 5,462,794 | 10/1995 | Lindemann et al. .................. 428/319.3 |

*Primary Examiner*—Michael Safavi

[57] ABSTRACT

A multilayer protective film useful in insulated wall structures of appliances such as refrigerators, freezers, or boiler units, for example. The multilayer protective film has a substantially polyolefin protective layer. The multilayer protective film also has a substantially polyolefin surface capable of bonding to polyurethane foam without the use of an adhesive. The multilayer protective film bonds to and protects thermoplastic liners from attack by blowing agents used in the production of polyurethane foam. The multilayer protective film is also adaptable to be regrind-compatible into thermoplastic liners made of styrenic polymers.

21 Claims, 1 Drawing Sheet

MULTILAYER PROTECTIVE FILM

CROSS-REFERENCE TO RELATED APPLICATION

This is a divisional of application Ser. No. 08/629,456 filed Apr. 10, 1996, which is a Continuation of Ser. No. 08/138,939 filed Oct. 18, 1993.

BACKGROUND OF THE INVENTION

The present invention relates to an insulated wall structure useful in appliances such as refrigerators, freezers, or boiler units, for example. More specifically, this invention relates to an insulated wall structure containing a thermoplastic liner, a foamed-in-place foam insulation material, and a multilayer protective film between the thermoplastic liner and the foam insulation material.

A conventional insulated wall structure typically contains a plastic liner made of high impact polystyrene ("HIPS") or acrylonitrile-butadiene-styrene ("ABS") and foamed-in-place foam insulation material. The foam insulation material used in a conventional wall structure is typically a polyurethane foam insulation using a chloroflorocarbon ("CFC") blowing agent.

The CFC blowing agents can diffuse from the foam insulation material into the atmosphere. Environmental concerns surrounding the use of CFCs has caused appliance manufacturers to seek alternatives to CFCs as blowing agents for the production of polyurethane foam insulation. One such alternative is hydrochlorofluorocarbon ("HCFC") blowing agents including, for example, dichlorotrifluoroethane ("HCFC-123") and dichlorofluoroethane ("HCFC-141b").

However, there are currently problems surrounding the use of some of these alternatives to CFCs as blowing agents. For example, liners made from HIPS tend to blister when bonded to foam insulation material containing HCFC. HCFCs have also been shown to cause cracking in liners made from ABS. Thus, there is a need in the industry for a mechanism to protect HIPS and ABS liners from HCFC blowing agents used in the production of polyurethane foam insulation.

One approach to protecting plastic liners from attack by HCFC blowing agents used in foam insulation material is to chemically modify the composition of the resin used in making the liner. A second approach is to use a protective film between the polyurethane foam insulation containing the blowing agent and the thermoplastic liner. The present invention relates to this second approach.

It is also desirable to produce a protective film that is regrind-compatible with the thermoplastic liner. A regrind-compatible film allows scrap material produced to be reprocessed back into the thermoplastic liner without significantly affecting important physical properties of the liner. The capability of reprocessing scrap materials reduces the need for scrap materials to be discarded. Consequently, the process of manufacturing related products, such as refrigerators, becomes more economical and more environmentally friendly.

U.S. Pat. No. 4,707,401 issued to Benford ("Benford '401") discloses an insulative cabinet wall structure having a bilayer film peelably bonded to a liner. The inner layer of the bilayer film in Benford '401 contains copolymers of ethylene and vinyl acetate and the outer layer contains copolymers of ethylene and acrylic acid. Benford '401 teaches having the inner layer of the bilayer film peelably bonded to the liner to prevent stress cracking in the liner. Benford '401 does not address the problem of HIPS liner blistering caused by HCFC blowing agents. Nor does Benford '401 address the desire for having a film that is regrind-compatible with a liner.

U.S. Pat. No. 5,118,174 issued to Benford ("Benford '174") discloses an insulated cabinet wall structure having laminated to it a multilayer film comprising in laminated sequence an inner adhesive, releasable film layer for adhering to the liner, a film of high elongation material, an additional adhesive film layer, and an outer barrier layer. Thus, Benford '174 requires a high elongation material sandwiched between two separate adhesive layers. Benford '174 does not address the desire for having a film that is regrind-compatible with a liner.

Accordingly, there is still a need in the industry for a protective film that is useful for protecting liners from HCFC blowing agents without requiring multiple adhesive layers. There also remains in the industry the need for such a protective film that is regrind-compatible with HIPS liners to which it may be bonded.

SUMMARY OF THE INVENTION

In one aspect the present invention is a multilayer protective film that can be laminated to a thermoplastic sheet. The resulting laminated sheet can then be thermoformed as needed and used as a liner in an insulated wall structure containing polyurethane foam. The multilayer film can bond to both the thermoplastic sheet and the rigid polyurethane foam while at the same time providing protection for the thermoplastic sheet from attack by blowing agents used in the rigid polyurethane foam.

The multilayer protective film is also designed so that the laminate may be made regrind-compatible with thermoplastic sheets made from styrenic polymers. A regrind-compatible laminate can be reprocessed back into a sheet made of styrenic polymers without significantly affecting important physical properties of the resulting liner. The laminate can be reprocessed either before or after it has been thermoformed.

In one aspect, the present invention is a multilayer protective film comprising a substantially polyolefin protective layer and an adhesive layer. The multilayer protective film may further comprise a substantially polyolefin layer containing a compatibilizer capable of compatibilizing blends of polyolefin and styrenic polymers, the compatibilizer being present in an amount such that the entire multilayer protective film contains from 0 percent to 20 percent by weight of the compatibilizer. The multilayer protective film has a substantially polyolefin surface. The substantially polyolefin surface may be defined by either the protective layer or the optional substantially polyolefin layer with compatibilizer. The adhesive layer is adapted to bond either the protective layer or the optional layer with compatibilizer to a styrenic polymer substrate. The multilayer protective film can be easily adapted to be regrind-compatible into thermoplastic sheets made of styrenic polymers. In another aspect of the present invention, the multilayer film above is laminated to a thermoplastic liner comprising a styrenic polymer. In yet another aspect, the present invention is an insulated wall structure, comprising: a) an outer wall; b) a thermoplastic liner consisting essentially of a styrenic polymer; c) a multilayer protective film of the present invention bonded to said thermoplastic liner; and d) a foamed-in-place polyurethane foam contiguous to said outer wall and disposed between said outer wall and the multilayer protective film, said polyurethane foam adhered to the substantially polyolefin surface of said multilayer protective film.

DESCRIPTION OF THE PREFERRED EMBODIMENTS

Figure 1:
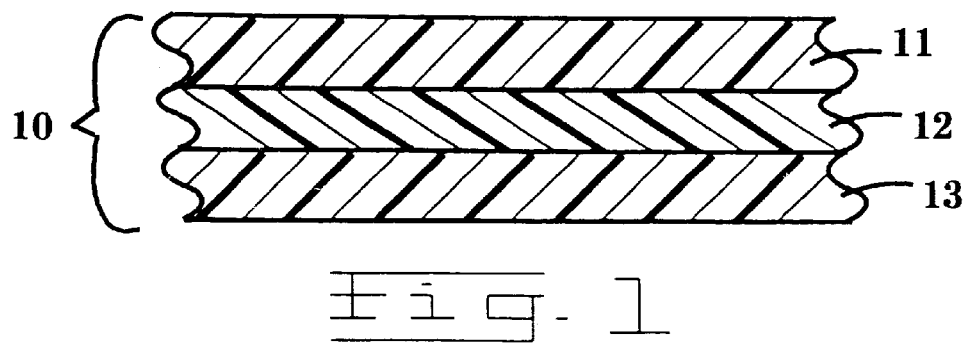
FIG. 1 shows an enlarged partial cross-sectional view of one embodiment of the multilayer protective film of the present invention.

The primary function of the protective layer of the multilayer protective film of the present invention is to protect thermoplastic liners from the blowing agents used in rigid polyurethane foam. The protective film does not act as a complete barrier to the blowing agents. Although some blisters may form on the surface of the liner adjacent the film, the protective film is sufficiently protective to effectively prevent blisters from appearing on the surface of the liner opposite the film (i.e., the "show side"). One possible explanation for this is that the film acts as a filtering mechanism causing the concentrations of blowing agent in contact with the liner to be insufficient to plasticize and blister the plastic through the entire thickness of the liner.

The protective layer is substantially polyolefin. The protective layer may contain a single polyolefin or a blend of polyolefins. Polyolefins useful in the protective layer of the present invention include, for example, polyethylene and polypropylene.

Preferably, the polyolefin is polyethylene. Polyethylenes useful in the protective layer of the present invention include, for example, high density polyethylene ("HDPE"), low density polyethylene ("LDPE"), and linear low density polyethylene ("LLDPE").

More preferably, the polyolefin is a HDPE with a density of from about 0.950 g/cc to about 0.970 g/cc. Most preferably, the polyolefin is a HDPE with a density of from about 0.959 g/cc to about 0.964 g/cc. Using a polyethylene with a greater density in the protective layer may produce a protective film with higher protective properties, but may also result in a film with somewhat lower tear strength in the machine direction.

In another preferred embodiment the protective layer contains a platelet filler such as talc or mica, for example. Adding a platelet filler to the protective layer enhances the protective property of the protective layer, resulting in fewer blisters being formed on the show side of styrenic polymer liners incorporated into an insulated wall structure of the present invention.

The maximum amount of platelet filler that can be incorporated into the protective layer is limited by processing. If the protective layer contains too much filler, processing may become difficult or impossible.

In one preferred embodiment the platelet filler is talc. Generally, the protective layer contains up to about 16 weight percent of talc based on the weight of the protective layer. Higher levels of talc do not significantly increase the protective property of the protective layer and may decrease the regrind-compatibility of the film. Preferably, the protective layer contains talc in an amount from about 6 weight percent to about 16 weight percent based on the weight of the protective layer. More preferably, the protective layer contains talc in an amount from about 6 weight percent to about 10 weight percent based on the weight of the protective layer.

The protective properties of a polyethylene film containing talc were tested. Four monolayer film samples of linear polyethylene (i.e., HDPE) were made. These film samples also contained talc. The film samples varied in the amount of linear polyethylene and talc in each film sample. The amounts of linear polyethylene and talc in each sample are shown in Table I.

TABLE I

Weight loss permeation data
Talc filled linear polyethylene films

| Sample Identification | Sample Composition |
|---|---|
| Sample #1 | 100% Linear Polyethylene |
| Sample #2 | 94% Linear Polyethylene + 6% Talc |
| Sample #3 | 90% Linear Polyethylene + 10% Talc |
| Sample #4 | 84% Linear Polyethylene + 16% Talc |

| Time Data Taken | Elapsed Time | Cummulative Time | Sample #1 | Sample #2 | Sample #3 | Sample #4 |
|---|---|---|---|---|---|---|
| 1/21/93 11:30 | 0:00 | 0.00 | 19.91 | 19.87 | 19.97 | 20.21 |
| 1/21/93 17:00 | 5:30 | 5.50 | 19.89 | 19.87 | 19.97 | 20.2 |
| 1/23/93 15:30 | 22:30 | 52.00 | 19.84 | 19.81 | 19.92 | 20.14 |
| 1/23/93 22:55 | 7:25 | 59.42 | 19.82 | 19.79 | 19.9 | 20.12 |
| 1/24/93 12:45 | 13:50 | 73.25 | 19.79 | 19.76 | 19.88 | 20.08 |
| 1/25/93 8:30 | 19:45 | 93.00 | 19.74 | 19.71 | 19.84 | 20.03 |
| Calculated Slope of Line = Permeation Rate | | | −0.0017 | −0.0017 | −0.0014 | −0.0018 |

A weight loss test on the four samples was conducted to determine what effect adding talc to a linear polyethylene material has on the permeation of HCFC 141b.

The weight loss test involves adding a known volume of liquid HCFC 141b (20 ml) to a small vial over which a small sample of the film is fixed. The film acts as a seal over the opening of the vial, and because the blowing agent has a low boiling point, a gaseous mixture of blowing agent and air is created under the film within the vial. The top surface of the film is exposed to atmosphere and ambient temperature. Over a period of time the weight of the vial is measured and noted.

The data in Table I lists the various data points that were taken over several hours time. The calculated slopes indicate the differences in the permeation rates of the films. The rate for 0 percent talc and 6 percent talc appears to be the same. However between 6 percent talc and 10 percent talc there appears to be a reduction in permeation rate. At 16 percent talc the permeation rate appears to return to that of 0 percent talc. Therefore, the range of between 6 percent and 16 percent talc appears to reduce the permeation rate of HCFC 141b.

The multilayer film of the present invention may also comprise a compatibilizing layer. When present, the compatibilizing layer 12 is also substantially polyolefin or a blend of polyolefins. Polyolefins useful in the compatibilizing layer 12 are generally the same polyolefins described above as being useful in the protective layer. Just as in the protective layer, using a polyethylene with a greater density in the compatibilizing layer may produce a multilayer protective film with higher protective properties, but may also result in a film with somewhat lower tear strength in the machine direction.

The compatibilizing layer may also contain a compatibilizer. The compatibilizer may be added to the compatibilizing layer to allow the multilayer protective film to be regrind-compatible into styrenic polymer liners. By regrind-compatible it is meant that the multilayer film may be reprocessed into a substantially styrenic polymer liner without significantly affecting important physical properties of the liner. This means that when a substantially styrenic polymer liner laminated with a multilayer protective film of the present invention is cut to size, any scrap material produced, or the entire laminated liner, can be reprocessed back into the liner extrusion process without affecting important physical properties of the liner.

It is well known that polyolefins and styrenic polymers are generally incompatible. If reprocessing a multilayer protective film of the present invention back into a styrenic polymer sheet will cause the percent of polyolefin in the resulting sheet to be greater than about 5 percent, then a compatibilizer must be used.

The compatibilizer must be capable of compatibilizing polyolefins and styrenic polymer blends. These types of compatibilizers are also well known. Examples of suitable compatibilizers include styrene-butadiene ("SB"), styrene-butadiene-styrene ("SBS"), styrene-ethylene-butadiene ("SEB"), styrene-ethylene-butylene-styrene ("SEBS"), styrene-isoprene ("SI"), styrene-isoprene-styrene ("SIS"), and maleic anhydride copolymers.

The amount of compatibilizer used in the film depends on the amount of polyolefin present in the sheet (due to reprocessed film and or laminated liner) to which the film will be laminated and on the desired level of regrind capability. Generally, the amount of compatibilizer needed in the compatibilizing layer of the film increases as the percent of polyolefin present in the liner increases. Also, as the desired percent of reprocessed film in a liner increases (i.e., the desired level of regrind-compatiblility) so does the needed amount of compatibilizer in the film.

Generally, the compatibilizing layer contains a sufficient amount of compatibilizer to make the multilayer protective film regrind-compatible with substantially styrenic polymer sheets to which the multilayer protective film is to be laminated. Preferably, the compatibilizer is present in the compatibilizing layer in an amount up to about 20 percent by weight of the entire multilayer protective film. More preferably, the compatibilizer is present in the compatibilizing layer in an amount from about 10 percent to about 15 percent by weight of the entire multilayer protective film.

Referring now to FIG. 1, the multilayer protective film 10 comprises three layers: a protective layer 11, a compatibilizer layer 12, and an adhesive layer 13. In the embodiment of the present invention shown in FIG. 1 the protective layer 11 defines the substantially polyolefin surface to which polyurethane foam may be bonded. However, this is not critical. The compatibilizing layer could serve as the surface layer. Preferably, the protective layer is the surface layer.

The function of the adhesive layer 13 is to adhere the multilayer protective film 10 to a thermoplastic sheet comprising a styrenic polymer such as HIPS or ABS. In one preferred embodiment the bond between the adhesive layer and the thermoplastic sheet is "permanent." By permanent bond it is meant that the bond is greater than the cohesive factors of the film. In other words, when the multilayer protective film is permanently bonded to a thermoplastic sheet the film can not feasibly be removed from the thermoplastic sheet once it has been laminated to the sheet without deforming the film by stretching or tearing it. An adhesive strength of at least about 7 ounces per inch of width is generally sufficient to form a permanent bond between the adhesive layer and the thermoplastic sheet.

To bond to a thermoplastic sheet, the adhesive layer contains a sufficient amount of adhesive polymer. Generally, the adhesive polymer is blended with a polyolefin resin such as LDPE, for example. The adhesive polymer can be any polymer that will bond with a sheet made substantially of styrenic polymers. In one preferred embodiment, the adhesive layer contains at least about 15 percent by weight of vinyl acetate. The vinyl acetate can be supplied, for example, by EVA.

Additionally, to improve handling of the film the adhesive layer may contain antiblock, which prevents blocking (i.e., the sticking of the film to itself). A preferred antiblock is $SiO_2$.

It should be noted that any or all layers of the multilayer film may be colored if desired. Likewise, fillers, pigments, dyes, antistatic compounds, bacteriosides, and other common additives may be included in one or more of the layers of the film.

Due to the strength of the bond between the multilayer protective film and the plastic liner, removing the film from the liner after lamination may not be feasible. Thus, the entire laminated liner may need to be reprocessed back into the liner in situations when a mistake is made during the lamination of the film to the plastic liner or during the thermoforming of the laminated plastic liner.

The overall thickness of the multilayer protective film is from about 1 mil to about 25 mils and preferably from about 6 mils to about 15 mils. When a compatibilizing layer is present, the thickness of the protective layer is from about 5 percent to about 65 percent, and preferably from about 15 percent to about 30 percent, of the overall thickness of the multilayer protective film. The thickness of the compatibilizing layer is from about 30 percent to about 90 percent, and preferably from about 45 percent to about 80 percent of the overall thickness of the multilayer protective film. The thickness of the adhesive layer is from about 5 percent to about 25 percent, and preferably from about 5 percent to about 10 percent of the overall thickness of the multilayer protective film.

The multilayer protective film can be made by coextruding the layers of the film on conventional extrusion equipment used in, for example, a conventional blown film or cast film coextrusion process.

Figure 2:
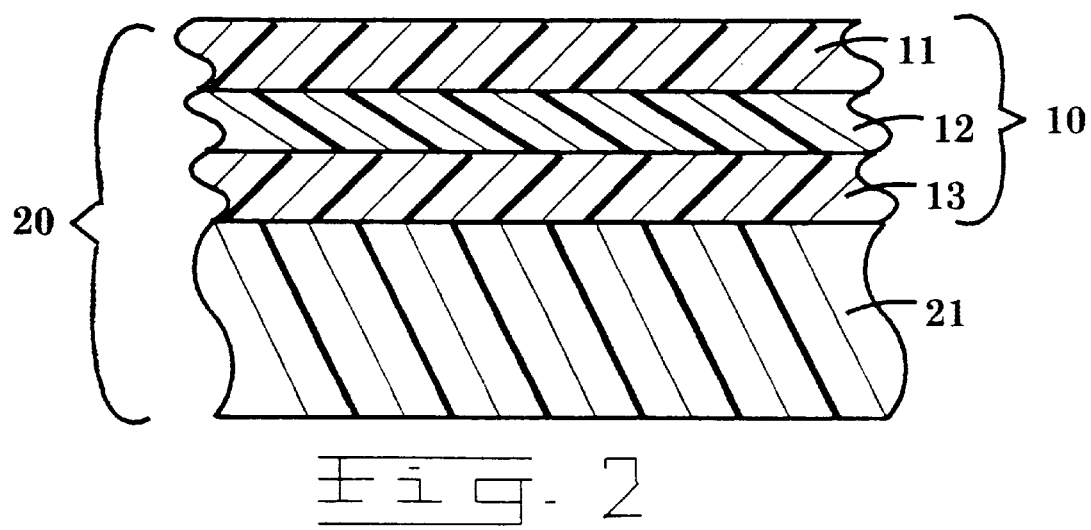
FIG. 2 shows an enlarged partial cross-sectional view of a multilayer protective film of the present invention laminated to a thermoplastic liner.

FIG. 2 shows the multilayer protective film 10 laminated to a thermoplastic sheet 21. The thermoplastic sheet 21 used in the present invention may be prepared by extrusion of a styrenic polymer resin in any conventional extrusion and calendaring process. Examples of useful styrenic polymers include polystyrene (e.g. HIPS), and ABS. Preferably, the styrenic polymer is polystyrene. More preferably, the styrenic polymer is HIPS.

The thermoplastic sheet 21 may also contain additives. Additives useful in the thermoplastic sheet 21 of the present invention include, for example, color concentrate and UV stabilizers.

The multilayer protective film 10 can be laminated to the thermoplastic sheet 21 to form a laminated liner 20 by conventional methods, such as by nipping the film to the sheet with a rubber coated nip roller while the sheet is still hot but slowly cooling during the normal sheet extrusion process.

The substantially polyolefin surface of the multilayer protective film can be subjected to corona treatment to provide a surface to which rigid polyurethane foam can bond. Preferably, the level of corona treatment is from about 35 dynes to about 65 dynes, and more preferably from about 38 dynes to about 65 dynes. This bonding of the multilayer protective film to polyurethane foam aids in cabinet stability when the protective film is incorporated into an insulated wall structure such as is found in a refrigerator appliance unit.

By incorporating the use of corona treatment, the present invention can avoid the need for using adhesive polymers to promote good adhesion to polyurethane foam. The method of corona treatment of a non-polar thermoplastic film surface to create a polar surface which enhances adhesion is a well known practice. A discussion of the surface treatment of polymer films and corona treating in general can be found in Chapter 14, "Surface Treatment", pp. 241–249 of *Web Processing and Converting Technology and Equipment*, (D. Satas, ed. 1984), Van Nostrand Reinhold Company, New York, N.Y.

However, it is also well known that corona-treated surfaces tend to lose their polar or adhesive characteristics if the surface is subsequently subjected to a heat treatment step such as thermoforming. Accordingly, corona treatment is not used to enhance adhesion to polyolefin surfaces in situations where the polyolefin surface would be subsequently heat-treated. Surprisingly, the corona-treated substantially polyolefin surface layer of the present invention still has sufficient adhesive capability to intimately adhere to the polyurethane foam, even after a thermoplastic sheet laminated with the multilayer protective film has been thermoformed.

After being cut to size, the laminated thermoplastic sheet of the present invention can be thermoformed into a desired liner configuration. By incorporating the use of corona treatment rather than using adhesive polymers for subsequent adhesion to polyurethane foam, it is possible to thermoform laminated thermoplastic sheets of the present invention with female mold tooling without the film sticking to the inside surface of the mold. Films utilizing an adhesive layer for adhesion to the polyurethane foam would have a tendency to stick to the mold but a layer such as the polyolefin surface layer in contact with the mold will not form the same adhesive bonds. Thus, a corona-treated polyolefin surface is not so adhesive as to bond to female mold tooling during thermoforming, but the corona-treated polyolefin surface is sufficiently adhesive to bond to polyurethane foam, even after the laminated liner has been thermoformed.

The thermoformed laminated liner 20 can be incorporated into an insulated wall structure. After being thermoformed, the laminated liner 20 can be inserted into, for example, a cabinet such as the kind used in making refrigerator appliance units. The cabinet defines an outer wall and the thermoformed liner defines an inner wall. The two walls are held in a spaced relationship while the insulating material is introduced into the space between the two walls by a foam-in-place operation. The method of construction of a refrigeration appliance unit in such a manner is disclosed in, for example, U.S. Pat. Nos. 3,960,631; 4,196,950; 4,505,919 and 4,707,401, the relevant portions of which are incorporated herein by reference.

Figure 3:
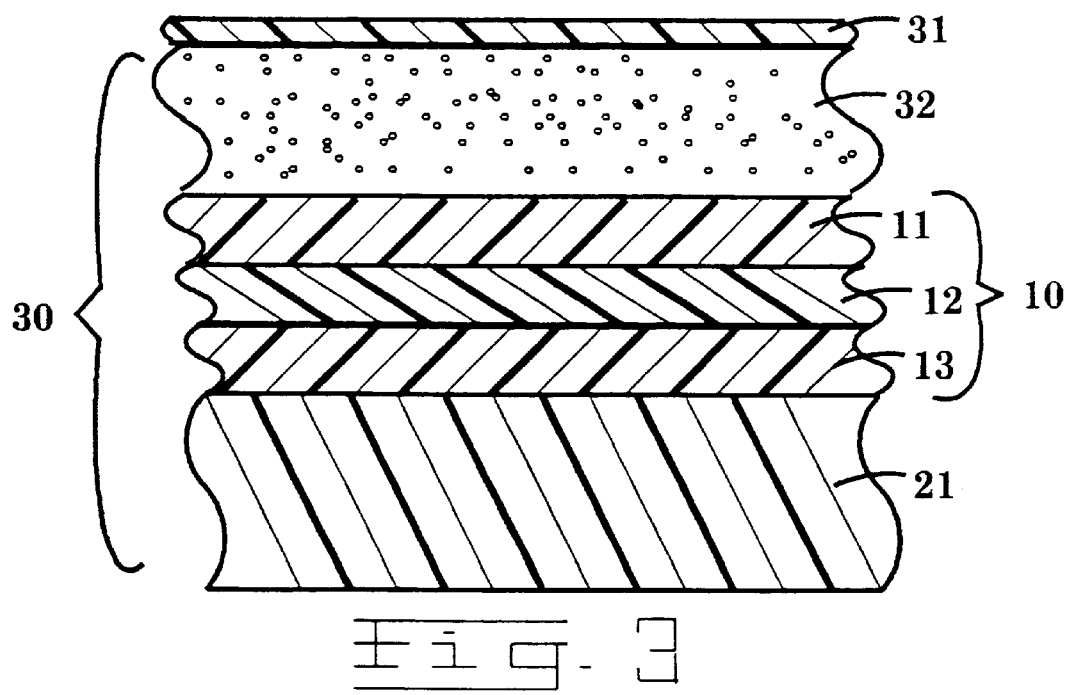
FIG. 3 shows an enlarged cross-sectional view of a multilayer protective film of the present invention incorporated into an insulated wall structure.

As shown in FIG. 3, the polyurethane foam insulation 32 fills the space between the cabinet wall 31 and the multilayer protective film 10.

The insulated wall structure 30 of the present invention can be that of, for example, a refrigeration appliance unit, a freezer, or a boiler housing. Such a unit made with the present invention generally comprises an outer wall 31, which may be, for example, a metal sheet or foil, wood, synthetic resin or the like; an inner liner wall 21 comprising a styrenic polymer; a multilayer protective film 10 laminated to the inner liner wall; and a body of foamed-in-place insulation 32 disposed between the protective film and the outer wall.

ILLUSTRATIVE EXAMPLES

These Examples are intended to be merely illustrative of the present invention, and should not be construed as implying any limitations with respect to the scope of the present invention, as defined by the claims following thereafter.

Example 1

A 10 mil sample of a protective film of the present invention was produced on a cast film production process.

The protective layer was composed of 92 percent by weight of linear polyethylene (i.e. HDPE) and 8 percent by weight of talc. The protective layer accounted for approximately 30 percent of the film's thickness. The compatibilizing layer was composed of 75 percent by weight of linear polyethylene and 25 percent by weight of styrene butadiene styrene block copolymer. The compatibilizing layer accounted for approximately 60 percent of the film's thickness. The adhesive layer was composed of 75 percent by weight of 28 percent vinyl acetate EVA resin, 15 percent by weight of a branched polyethylene, and 10 percent by weight of an $SiO_2$ anti-block concentrate. The adhesive layer accounted for approximately 10 percent of the film's thickness.

The film was then laminated to a HIPS sheet in a standard sheet extrusion process by laminating the film to the heated sheet with a rubber coated nip roller. The laminated sheet was then cut to size and thermoformed into refrigerator liner shapes. The formed liners were then mounted in metal cabinets and polyurethane foam was injected to fill the space between each plastic liner and outer metal cabinet. HCFC 141b was the blowing agent used in the polyurethane foam. These cabinets were stored at ambient temperature for approximately 40 days. The cabinets were then thermal cycled 10 times from −40° F. to 140° F. During each cycle the cabinets were held at −40° F. for a period of 5 hours and 140° F. for a period of 5 hours.

At the conclusion of thermal cycling, the cabinets were inspected for blisters or cracks on the inside surface (i.e., show side) of the plastic liner. There were no visible defects as a result of HCFC 141b chemical attack on the inside surface of the plastic liner.

Example 2

Using a cast film process, a multilayer film was made identical to the film of Example 1 except the thickness of the film was changed from 10 mils to 7 mils. The multilayer film sample was subjected to regrind studies to determine what effect reprocessing the film back into a HIPS sheet has on the physical properties of the HIPS sheet. A 125 mil thick sheet was extruded from a blend of 96 percent HIPS and 4 percent color concentrate ("original HIPS blend"). This sheet represents pass one of the regrind studies. On this and subsequent passes, the sheet was laminated with the multilayer film, then the laminated sheet was reground and reprocessed back into the HIPS sheet. Thus for each pass of the regrind studies, the sheet of the previous pass was laminated with the multilayer film and then a laminated sheet was reground back into the HIPS sheet. The percent of film in each sheet and the percent of styrene butadiene styrene in each sheet was calculated. The results of these calculations are in Table II. The percent regrind in Table II is the percent of the sheet represented by the reground laminated sheet of the previous pass.

TABLE II

Regrind Calculations

| Sheet Number | Pass Number | Percent Regrind | Percent Film in Sheet | Percent SBS in Sheet |
| --- | --- | --- | --- | --- |
| 2A | 1 | 0 | 0 | 0 |
|  | 2 | 50 | 2.26 | 0.28 |
| 2B | 3 | 50 | 3.38 | 0.42 |
|  | 4 | 50 | 3.95 | 0.49 |
| 2C | 5 | 50 | 4.23 | 0.53 |
|  | 6 | 50 | 4.37 | 0.55 |
| 2D | 7 | 50 | 4.44 | 0.56 |
| 2E | 8 | 75 | 6.72 | 0.84 |
| 2F | 9 | 100 | 11.23 | 1.40 |

Several of the sheets produced in the regrind studies were subjected to various physical property tests. The results of these tests are shown in Table III.

TABLE III

Regrind Studies

| Sheet Number | Instrumented ImpacT (in-lb) | | Izod Impact | Tensile Yield Stress | Elongation Yield/ | Flex Modulus |
| --- | --- | --- | --- | --- | --- | --- |
|  | 73° F. | 0° F. | 73° F. | (psi) | Break (%) | (%) |
| 2A | 143 | 94 | 1.24 | 2374 | 1.4/37 | 195,000 |
| 2B | 105 | 100 | 1.22 | 2332 | 1.4/36 | 191,000 |
| 2C | 129 | 89 | 1.22 | 2328 | 1.4/44 | 191,000 |
| 2D | 128 | 78 | 1.20 | 2330 | 1.4/43 | 186,000 |
| 2E | 114 | 84 | 1.20 | 2343 | 1.5/39 | 188,000 |
| 2F | 101 | 74 | 1.00 | 2395 | 1.5/38 | 180,000 |

What is claimed is:

1. An insulated structure consisting essentially of:
   (a) an outer wall;
   (b) a substantially styrenic polymer layer;
   (c) an adhesive layer adjacent to said substantially styrenic polymer layer;
   (d) a protective layer adjacent to said adhesive layer, said protective layer consisting essentially of polyethylene and up to about 16 weight percent talc based on the weight of said protective layer;
   (e) a compatibilizing layer adjacent to said protective layer, said compatibilizing layer consisting essentially of polyethylene and a compatibilizer capable of compatibilizing blends of polyethylene and styrenic polymers; and
   (f) a polyurethane foam disposed between said protective layer and said outer wall, said foam being adjacent to said compatibilizing layer and said outer wall.

2. An insulated structure according to claim 1, wherein said adhesive layer is permanently bonded to said styrenic polymer layer.

3. An insulated structure according to claims 1, wherein said adhesive layer is bonded to said styrenic polymer layer with an adhesive strength of at least about 7 ounces per inch of width.

4. An insulated structure according to claim 1, wherein the talc is present in an amount from about 6 percent to about 16 percent by weight of said protective layer.

5. An insulated structure according to claim 1, wherein the talc is present in an amount from about 6 percent to about 10 percent by weight of said protective layer.

6. A thermoformable liner consisting essentially of:

(a) a substantially styrenic polymer layer;

(b) an adhesive layer adjacent to said substantially styrenic polymer layer;

(c) a compatibilizing layer adjacent to said adhesive layer, said compatibilizing layer consisting essentially of polyethylene and a compatibilizer capable of compatibilizing blends of polyethylene and styrenic polymers; and (d) a protective layer adjacent to said compatibilizing layer, said protective layer consisting essentially of polyethylene and up to about 16 weight percent talc based on the weight of said protective layer.

7. A thermoformable liner according to claim 6, wherein the talc is present in an amount from about 6 percent to about 16 percent by weight of said protective layer.

8. A thermoformable liner according to claim 6, wherein the talc is present in an amount from about 6 percent to about 10 percent by weight of said protective layer.

9. A thermoformable liner according to claim 6, wherein said adhesive layer is permanently bonded to said substantially styrenic polymer layer.

10. A thermoformable liner according to claim 6, wherein said adhesive layer is bonded to said substantially styrenic polymer layer with an adhesive strength of at least about 7 ounces per inch of width.

11. A multilayer protective film consisting essentially of:

(a) a protective layer consisting essentially of polyethylene and up to about 16 weight percent talc based on the weight of the protective layer;

(b) a compatibilizing layer adjacent to said protective layer, said compatibilizing layer consisting essentially of polyethylene and a compatibilizer capable of compatibilizing blends of polyethylene and styrenic polymers; and (c) an adhesive layer adjacent to said compatibilizing layer, said adhesive layer comprising an adhesive polymer adapted to bond to styrenic polymer substrates.

12. The multilayer protective film of claim 11, wherein talc is present in an amount from about 6 percent to about 10 percent by weight of the protective layer.

13. The multilayer protective film of claim 11, wherein the compatibilizer in said compatibilizing layer is a copolymer selected from the group consisting of styrene-butadiene copolymers, styrene-butadiene-styrene copolymers, styrene-ethylene-butadiene copolymers, styrene-ethylene-butylene-styrene copolymers, styrene-isoprene copolymers, styrene-isoprene-styrene copolymers and maleic anhydride copolymers.

14. The multilayer protective film of claim 11, wherein the compatibilizer in said compatibilizing layer is a styrene-butadiene-styrene copolymer.

15. The multilayer protective film of claim 11, wherein the compatibilizer in said compatibilizing layer comprises from 10 percent to about 15 percent by weight of the multilayer protective film.

16. The multilayer protective film of claim 11, wherein said adhesive layer contains at least about 15 percent by weight of vinyl acetate.

17. The multilayer protective film of claim 16, wherein the vinyl acetate is in the form of EVA.

18. The multilayer protective film of claim 11, wherein the total thickness of the multilayer protective film is from about 1 mil to about 25 mils.

19. The multilayer protective film of claim 11, wherein the total thickness of the multilayer protective film is from about 6 mils to abut 15 mils.

20. The multilayer protective film of claim 11, wherein the thickness of said protective layer is from about 5 percent to about 65 percent of the thickness of the total film, the thickness of said compatibilizing layer is from about 30 percent to about 90 percent of the thickness of the total film, and the thickness of said adhesive layer is from about 5 percent to about 25 percent of the thickness of the total film.

21. The multilayer protective film of claim 11, wherein the thickness of said protective layer is from about 15 percent to about 30 percent of the thickness of the total film, the thickness of said compatibilizing layer is from about 45 percent to about 80 percent of the thickness of the total film, and the thickness of said adhesive layer is from about 5 percent to about 10 percent of the thickness of the total film.

* * * * *